(12) United States Patent
Zheng et al.

(10) Patent No.: US 12,357,923 B2
(45) Date of Patent: Jul. 15, 2025

(54) PHOTOTHERMAL EVAPORATOR FOR A DESALINATION SYSTEM AND METHOD OF MANUFACTURE

(71) Applicants: Northeastern University, Boston, MA (US); Soleeva Energy, Inc., San Jose, CA (US)

(72) Inventors: Yi Zheng, Canton, MA (US); Ralph Ahlgren, San Jose, CA (US); Mohamed Sonbaty, San Jose, CA (US); Khushnood Ahmad Qazi, Los Altos, CA (US)

(73) Assignees: Northeastern University, Boston, MA (US); Soleeva Energy, Inc., San Jose, CA (US)

( * ) Notice: Subject to any disclaimer, the term of this patent is extended or adjusted under 35 U.S.C. 154(b) by 34 days.

(21) Appl. No.: 18/044,304

(22) PCT Filed: Aug. 25, 2021

(86) PCT No.: PCT/US2021/047437
§ 371 (c)(1),
(2) Date: Mar. 7, 2023

(87) PCT Pub. No.: WO2022/055703
PCT Pub. Date: Mar. 17, 2022

(65) Prior Publication Data
US 2023/0338870 A1  Oct. 26, 2023

Related U.S. Application Data

(60) Provisional application No. 63/075,530, filed on Sep. 8, 2020.

(51) Int. Cl.
*C02F 1/14* (2023.01)
*B01D 1/00* (2006.01)
(Continued)

(52) U.S. Cl.
CPC ........... *B01D 1/221* (2013.01); *B01D 1/0035* (2013.01); *B01D 1/30* (2013.01); *C02F 1/043* (2013.01);
(Continued)

(58) Field of Classification Search
CPC .................. C02F 1/04–20; B01D 1/0035
See application file for complete search history.

(56) References Cited

U.S. PATENT DOCUMENTS

| 2014/0158610 A1 | 6/2014 | Qtaishat et al. |
| 2015/0353385 A1 | 12/2015 | Wang et al. |
| 2020/0354233 A1* | 11/2020 | Wang ................. C02F 1/14 |

FOREIGN PATENT DOCUMENTS

| CN | 109652012 A | | 4/2019 | |
| CN | 111302423 A | * | 6/2020 | ............... C02F 1/14 |

(Continued)

OTHER PUBLICATIONS

Wanfeng Yang, Jiawei Wang, Wensheng Ma, Chaoqun Dong, Guanhua Cheng, Zhonghua Zhang, "Free-standing CuO nanoflake arrays coated Cu foam for advanced lithium ion battery anodes", Journal of Power Sources, vol. 333, 2016, pp. 88-98, ISSN 0378-7753, https://doi.org/10.1016/j.jpowsour.2016.09.154.*

(Continued)

*Primary Examiner* — Jonathan Luke Pilcher
(74) *Attorney, Agent, or Firm* — Foley Hoag LLP; Dana M. Gordon; John D. Lanza

(57) ABSTRACT

An interconnected open-pore 2.5D Cu/CuO foam-based photothermal evaporator capable of achieving a high evaporation rate of 4.1 kg m$^{-2}$ h$^{-1}$ under one sun illumination by exposing one end of the planar structure to air is disclosed. The micro-sized open-pore structure of Cu/CuO foam allows it to trap incident sunlight, and the densely distributed blade-like CuO nanostructures effectively scatter sunlight (Continued)

inside pores simultaneously. The inherent hydrophilicity of CuO and capillarity forces from the porous structure of Cu foam continuously supply sufficient water. Moreover, the doubled working sides of Cu/CuO foam enlarge the exposure area enabling efficient vapor diffusion. The feasible fabrication process and the combined structural features of Cu/CuO foam offer new insight into the future development of solar-driven evaporators in large-scale applications with practical durability.

12 Claims, 10 Drawing Sheets

(51) Int. Cl.
| | |
|---|---|
| *B01D 1/22* | (2006.01) |
| *B01D 1/30* | (2006.01) |
| *C02F 1/04* | (2023.01) |
| *C23C 22/63* | (2006.01) |
| *F24S 10/80* | (2018.01) |
| *F24S 70/20* | (2018.01) |
| *C02F 103/08* | (2006.01) |

(52) U.S. Cl.
CPC ............... *C02F 1/048* (2013.01); *C02F 1/14* (2013.01); *C23C 22/63* (2013.01); *F24S 10/80* (2018.05); *F24S 70/20* (2018.05); *C02F 2103/08* (2013.01); *C02F 2305/08* (2013.01)

(56) References Cited

FOREIGN PATENT DOCUMENTS

| WO | WO-2019/053638 A1 | 3/2019 |
|---|---|---|
| WO | WO-2022/055703 A2 | 3/2022 |

OTHER PUBLICATIONS

Mahmood R.S. Shirazy, Sonia Blais, Luc G. Fréchette, Mechanism of wettability transition in copper metal foams: From superhydrophilic to hydrophobic, Applied Surface Science, vol. 258, Issue 17, 2012, pp. 6416-6424, ISSN 0169-4332, https://doi.org/10.1016/j.apsusc.2012.03.052.*

Ying Xu, Jiaxiang Ma, Yu Han, Jingjing Zhang, Fuyi Cui, Ying Zhao, Xin Li, and Wei Wang, "Multifunctional CuO Nanowire Mesh for Highly Efficient Solar Evaporation and Water Purification", ACS Sustainable Chemistry & Engineering 2019 7 (5), 5476-5485, DOI: 10.1021/acssuschemeng.8b06679.*

Espacenet Translation of CN 111302423 A.*

Guo, Yang and Sui, Yujin and Zhang, Jiajie and Cai, Zaisheng and Xu, Bi, "An all-day solar-driven vapor generator via photothermal and Joule-heating effects", J. Mater. Chem. A, 2020, 9, 47, 25178-25186, The Royal Society of Chemistry.*

Shum, C., Rosengarten, G. & Zhu, Y. "Enhancing wicking microflows in metallic foams", Microfluid Nanofluid 21, 177 (2017), https://doi.org/10.1007/s10404-017-2018-0.*

J. M. Davies, P. H. Peter, and R. J. Goff, "An Absorbing Surface for Measuring Intense Thermal Radiation," Appl. Opt. 9, 1473-1474 (1970).*

International Search Report and Written Opinion for International Application No. PCT/US2021/047437 dated Mar. 30, 2022.

Invitation to Pay Additional Fees for International Application No. PCT/US21/47437 mailed Jan. 28, 2022.

Extended European Search Report for EP Application No. 21867351.5 dated Aug. 29, 2024.

Liu et al., "An easy-to-fabricate 2.5D evaporator for efficient solar desalination," Advanced Functional Materials 31.27 (2021): 2100911.

Zhao et al., "Solar-powered Janus membrane for one-step conversion of sewage to clean water." Chemical Engineering Journal 387 (2020): 124131.

* cited by examiner

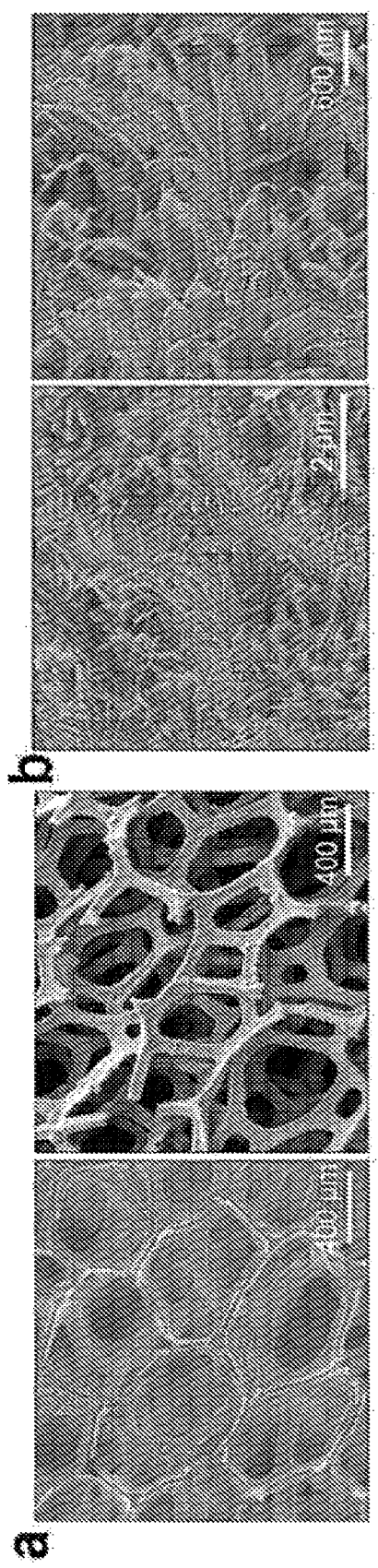
FIG. 2A
FIG. 2B
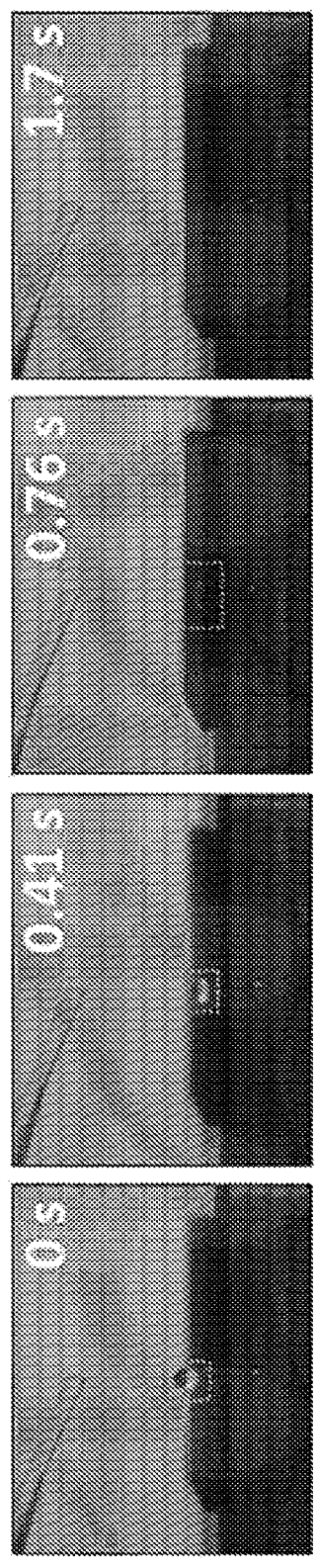
FIG. 2F

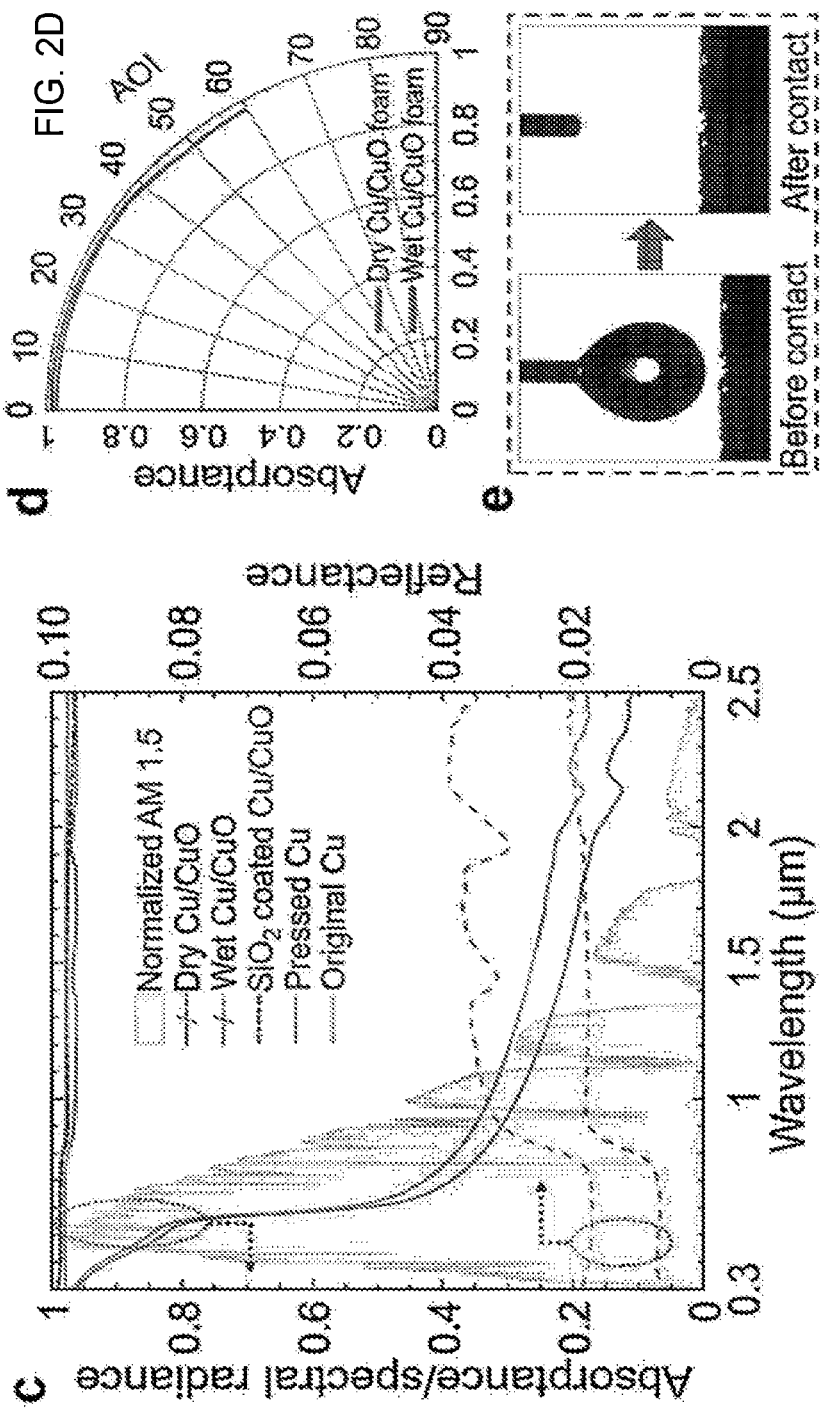

PHOTOTHERMAL EVAPORATOR FOR A DESALINATION SYSTEM AND METHOD OF MANUFACTURE

CROSS REFERENCE TO RELATED APPLICATION

This application is the US National Phase of International Application PCT/US2021/047437 filed on Aug. 25, 2021, which claims priority from U.S. Provisional Patent Application No. 63/075,530 filed on Sep. 8, 2020 entitled HIGHLY EFFICIENT ALL-IN-ONE EVAPORATOR FOR SOLAR-DRIVEN WATER DESALINATION, which is hereby incorporated by reference.

GOVERNMENT SUPPORT

This invention was made with government support under Grant No. CBET-1941743 awarded by the National Science Foundation. The government has certain rights in the invention.

BACKGROUND

The present application relates generally to a solar-driven evaporator that can be used in water desalination and purification systems.

Obtaining fresh water is essential and indispensable for the survival of mankind. Although about 71% of earth's surface is covered by water, saltwater oceans contain about 97.5% of all of earth's water, and nearly all of the remaining fresh water is trapped as ice and below ground. [1] While fresh water is scarce, solar energy is inexhaustible. Solar energy harvesting is a very clean and inexhaustible clean energy generation method that can be applied to solar-thermal technologies. Solar-driven steam generation systems employ solar energy as the sole energy input required to produce clean water directly from seawater without use of fossil fuels or any moving parts. [2] This method offers a promising solution to the water crisis, especially for remote regions. The field of solar-driven steam generation has experienced an accelerated change from bottom-heating-based evaporation, in which heat and steam are generated separately in the fluid [3] to volumetric heating-based evaporation, which uses nanofluids to convert the solar irradiation into thermal energy, which heats the liquid and reduces surface heat losses. Most recently, interfacial heating-based evaporation has also achieved high evaporation efficiency by localizing the heat at the air-liquid interface.

To date, a substantial number of studies have been performed that focus on achieving a highly efficient evaporation rate and photothermal conversion efficiency within solar-driven steam generation. [4-6] There are several design factors that have been used to significantly raise the effectiveness of 2D evaporator designs, including using photothermal materials with broadband optical absorption, [7,8] minimizing heat loss to the water sink and ambient environment, [9] and implementing an efficient water transport path. [10,11] More recently, a large number of 3D evaporator designs have exhibited evaporation performance far exceeding the theoretical limit for 2D structure designs because 3D structures reduce diffuse reflection and heat loss, [12-14] provide a large expansion of the evaporation surface area, [15-17] and use side areas that obtain energy from the ambient surroundings. Currently, most 3D evaporators focus on recovering heat lost by the solar absorber surface. As such, these evaporator designs typically alter many geometric factors that result in a significant enhancement of evaporation performance such as cylindrical cups, conical structures, sunflower disc-shaped structures, and coil structures. However, when fabricated into various spatial geometry structures, these evaporators tend to require more photothermal materials and be restricted to small-scale applications due to spatially structural stability and mechanical strength limitations. Notably, these complex spatial evaporator structures hinder vapor from diffusing out of the porous structures to the air, which impairs the evaporation performance. Another factor that hinders strong evaporation performance in 3D structures is the water supply for the entire evaporators. Insufficient water supply causes salt accumulation on the solar absorber surface and in the water transfer paths, which greatly reduces light absorption and clogs water channels with salt crystals, respectively. As such, there is still significant room for improvement in 3D evaporators for practical applications featuring more efficient space utilization, simplified structure design, and long-term stability.

BRIEF SUMMARY OF THE DISCLOSURE

In accordance with one or more embodiments, a photothermal evaporator is disclosed for a water desalination system. The evaporator comprises a planar copper (Cu) foam having an interconnected open-pore structure and a nanostructured copper oxide (CuO) layer formed on outer surfaces of the Cu foam functioning as a photothermal material. The evaporator is configured to have one end positioned in a body of water and an opposite end positioned in air above the body of water and exposed to incident sunlight. The evaporator is configured for drawing water from the body of water through capillary action and converting the incident sunlight to heat for evaporating the water.

In accordance with one or more further embodiments, a method is disclosed for manufacturing a photothermal evaporator for a water desalination system. The method includes the steps of: (a) pressing a planar copper (Cu) foam structure having an interconnected open-pore structure; and (b) immersing the Cu foam structure in an alkaline solution to form nanostructured copper oxide (CuO) layer on outer surfaces of the Cu foam structure to function as a photothermal material.

In accordance with one or more additional embodiments, a solar-driven evaporation system is disclosed. The system comprises a body of water and a photothermal evaporator. The evaporator comprises a planar copper (Cu) foam having an interconnected open-pore structure and a nanostructured copper oxide (CuO) layer formed on outer surfaces of the Cu foam functioning as a photothermal material. The evaporator is configured to have one end positioned in the body of water and an opposite end positioned in air above the body of water and exposed to incident sunlight. The evaporator is configured for drawing water from the body of water through capillary action and converting the incident sunlight to heat for evaporating the water. The evaporator has an oblique orientation relative to a surface of the body of water.

BRIEF DESCRIPTION OF THE DRAWINGS

FIG. 1A shows the evaporator in a 2D flat and 2.5D oblique orientations employed in solar-driven desalination. FIG. 1B shows an experimental set-up for the solar-driven steam generation using the Cu/CuO foam evaporator with excellent water absorption and photothermal performance under solar irradiation. FIG. 1C schematically illustrates the steam generation process using the Cu/CuO foam. Upon exposure to solar irradiation, the nanostructured CuO on the surface of Cu foam functions as a photothermal material that can effectively absorb solar irradiation and convert it into heat to achieve water evaporation (upper area of Cu/CuO foam). The innate hydrophilicity of CuO and micro-sized interconnected porous structure of the foam enable adequate water pumped from bulk water to the top heating area to achieve rapid evaporation (arrows in the water). Simultaneously, the doubled working sides of the Cu/CuO foam (sunny side and shady side) increase the exposure area and effectively diffuse the generated vapor into the air (wave arrows). FIG. 1D illustrates an exemplary fabrication process of the Cu/CuO foam with nanostructured CuO. The original pressed Cu foam is cleaned in series with acetone in an ultrasonic bath and a hydrochloric acid (HCl) solution at room temperature. The cleaned Cu foam is immersed into an alkaline solution heated up to 95° C. to form nanostructured CuO on the surface of the Cu foam forming the Cu/CuO foam. The images from left to right show the foam at different fabrication stages: original pressed Cu foam, after acetone cleaning, after HCl solution cleaning, and after immersion into hot alkaline solution. The enlarged views of the photographs indicate the interconnected open-pore structure of Cu foam and Cu/CuO foam. Different colors of the enlarged views correspond to the fabrication stage of the foam (from left to right): with organic residues on the surface of Cu foam, with native oxide film on the surface of Cu foam, the cleaned Cu foam, and with nanostructured CuO on the surface of the Cu foam.

FIGS. 2A-2F illustrate the optical and surface characterizations of the 2.5D Cu/CuO foams. Scanning electron microscopy (SEM) images show the porous structures of the original Cu foam (left side of FIG. 2A) and Cu/CuO foam (right side of FIG. 2A). The blade-like nanostructured CuO is shown in FIG. 2B. UV-vis-NIR spectra of the Cu foams and Cu/CuO foams at different states is shown in FIG. 2C. The left axis shows the absorption spectra of dry/wet/silica ($SiO_2$) coated Cu/CuO foams and pressed/original Cu foams, and the normalized spectral solar irradiance density of AM 1.5 (ASTM G173) solar spectrum, respectively. The right axis shows the reflectance spectra of dry and wet Cu/CuO foams. The solid and dashed red curves represent the absorptance and reflectance spectra of the dry Cu/CuO foam, and the solid and dashed blue curves represent the absorptance and reflectance spectra of the wet Cu/CuO foam. The solar absorptance of Cu/CuO foams across various angles of incidence (AOI) results in high hemispherical solar absorptance in both the dry and wet states as shown in FIG. 2D. The superhydrophilic propriety of the Cu/CuO foam is shown by its water contact angle in FIG. 2E. Time-dependent water transportation in the foam is shown in FIG. 2F.

FIG. 3A is a schematic illustration of an experimental setup for water diffusion in 2.5D Cu/CuO foams that are pressed to different thickness. From left to right: the test setup, the 2.5D Cu/CuO foam with 55° tilt angle held by a layer of polyethylene foam is placed in a test container full of UV reactive water, and the photographs of the Cu/CuO foams with the thickness of 3, 2 (pre-pressed), and 1 mm (pre-pressed), respectively. FIG. 3B shows photographs of time-dependent water diffusion in the 2.5D Cu/CuO foams with different thickness. The scale bar is 10 mm. FIG. 3C shows thermal conductivity of foams with different states. The insets, in the order of number, are photographs of the 3 mm thick Cu foam, 2 mm thick Cu foam, 2 mm thick dry Cu/CuO foam, and 2 mm thick wet Cu/CuO foam, respectively. In the fourth photograph, the wet CuO foam was placed on a dry white tissue, and blue dashed curve shows the border between wet and dry area of the tissue. FIG. 3D shows the porosity (left-hand side axis) and the corresponding water adsorption (right-hand side axis). FIG. 3E shows the evaporation rate of the Cu/CuO foams in the thickness of 1, 2, and 3 mm, respectively.

FIG. 4A is a schematic illustration of the setup of the steam generation measurement with the oblique Cu/CuO foam placed in the water container. The dimensions of the Cu/CuO foam exposed in air are 55° in tilt angle, 30 mm in length, 44 mm in width, and 2 mm in thickness. FIG. 4B shows time-dependent infrared (IR) thermal images of the 2.5D Cu/CuO foam (first row) and the single-side CuO foam (second row) in the steam generation experiments under one Sun irradiation for 0, 15, and 60 min in air at room temperature. The white plus signs in the thermal images represent the central point of the foam where the temperature is measured. FIG. 4C shows the central temperature of the CuO foam and the single-side 2.5D Cu/CuO foam relative to irradiation time under one Sun. FIG. 4D shows the mass changes of water with the single-side 2.5D Cu/CuO foam, and the 2.5D Cu/CuO foam under one Sun compared with pure water as control experiment. The inset shows a photograph of the single-side Cu/CuO foam, sticking the Cu/CuO foam with transparent tape on the shady side. FIG. 4E shows the dependence of evaporation rate (the blue bars for left-hand side) and the corresponding mass loss (the orange bars for right-hand side) on the length of the Cu/CuO foam with a tilt angle of 55°. Inset shows a schematic of the evaporator device and defines the length of the Cu/CuO foam. FIG. 4F shows the dependence of mass loss and evaporation rate (left-hand side) with corresponding projection area on the tilt angle of the Cu/CuO foam in the evaporation device.

FIG. 5A shows the mass changes of water for the 2.5D Cu/CuO foam in a dark environment at room temperature over time, with pure water as the control. FIG. 5B shows the mass changes of salt water with different salinity for the 2.5D Cu/CuO foam under one sun. FIG. 5C shows the process of salt rejection of the 2.5D Cu/CuO foam, which is placed in a container filled with 3.5 wt % NaCl solution. FIG. 5D is a schematic illustration of the setup for concentrated solar irradiation with a Fresnel lens. The zoomed in part on the right is a photograph of the 2.5D Cu/CuO foam under five suns irradiation, where steam is visible in the red dashed circle. FIG. 5E shows the evaporation rate of the 2.5D Cu/CuO foam at various solar intensities. FIG. 5F shows a comparison of water salinity before and after desalination.

DETAILED DESCRIPTION

Figures 1A, 1B, 1C:
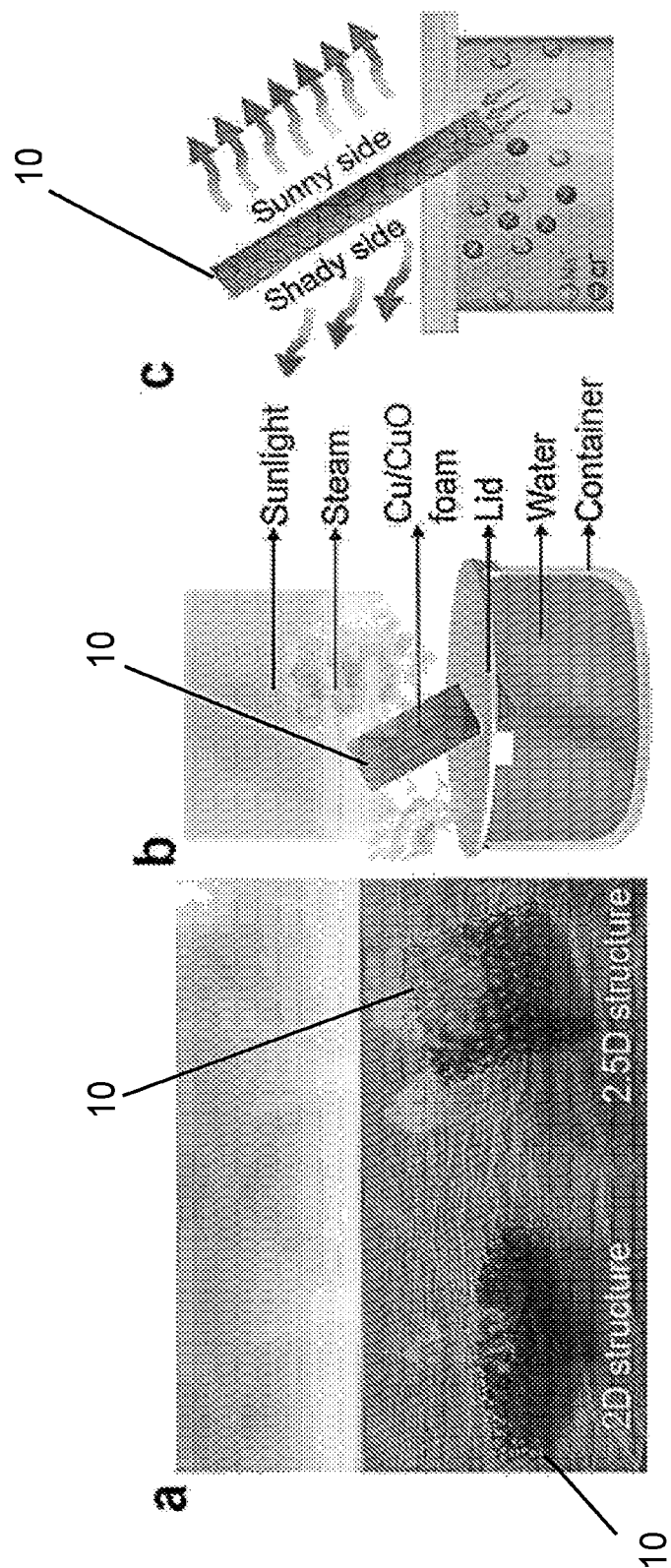
FIGS. 1A-1D illustrate an exemplary Cu/CuO foam-based 2.5D solar-driven evaporator in accordance with one or more embodiments.

Various embodiments disclosed herein relate to a novel design of a 2.5D porous photothermal evaporator. The evaporator 10 extends a typical 2D structure with an added third vertical dimension, comprising a planar interconnected open-pore foam having one end of the 2D structure lifted into the air, as shown in FIG. 1A. This spatial change for a 2D structure, from lying flat on the water to tilting partially out of the water, greatly improves its evaporation performance and broadens its practical application potential. The planar foam with a porous structure and excellent hydrophilicity provides a greatly enlarged evaporation surface, and an adequate supply of water to the whole material even with an extensively reduced contact area in the bulk water. More importantly, the 2.5D interconnected open-pore structure has more surface area exposed to the air, including one side facing the sunlight (sunny side) and the one side sheltered from sunlight (shady side). This enables efficient direct diffusion of the generated vapor. In addition, when compared to a similar 2D structure, no extra photothermal materials are required for the 2.5D evaporator 10, and the simple planar structure without additional accessories is very suitable for large-scale applications. It should be noted that the area in direct contact with water is greatly reduced when the 2D structure is lifted up at one end, which is conducive to the reduction of heat loss to the bulk water. In one exemplary embodiment as shown in FIG. 1B, a single planar Cu foam featuring an interconnected open-pore structure with nanostructured copper CuO on the surface (Cu/CuO foam) is disclosed as an integrative 2.5D photothermal evaporator 10 with a tilt angle of 55°, which exhibits excellent evaporation performance. Nanostructured CuO formed on the surface of the Cu foam is a widely used photothermal material with excellent solar absorption in the visible regime, and its excellent hydrophilicity simultaneously provides sufficient water supply throughout the evaporator. In addition, the enlarged evaporation surface results in a highly efficient phase transition of water from liquid to vapor, and the increased air-exposed area (sunny and shady sides) assists ample generated vapor in diffusing out (as shown in FIG. 1C). The interconnected open-pore structure of the Cu foam meets the structural requirements mentioned above. Furthermore, nanostructured CuO is obtained through a one-step wet-chemical oxidation reaction of the Cu foam—a facial fabrication process that contributes to the scalability of the evaporator in practical applications. Under one sun irradiation, an exemplary Cu/CuO foam sample of dimensions 30 mm×44 mm×2 mm achieved an evaporation rate of 4.1 kg m$^{-2}$ h$^{-1}$ when a 55° tilt angle is used.

Fabrication and Characterization of the 2.5D Cu/CuO Foams

Figure 1D:
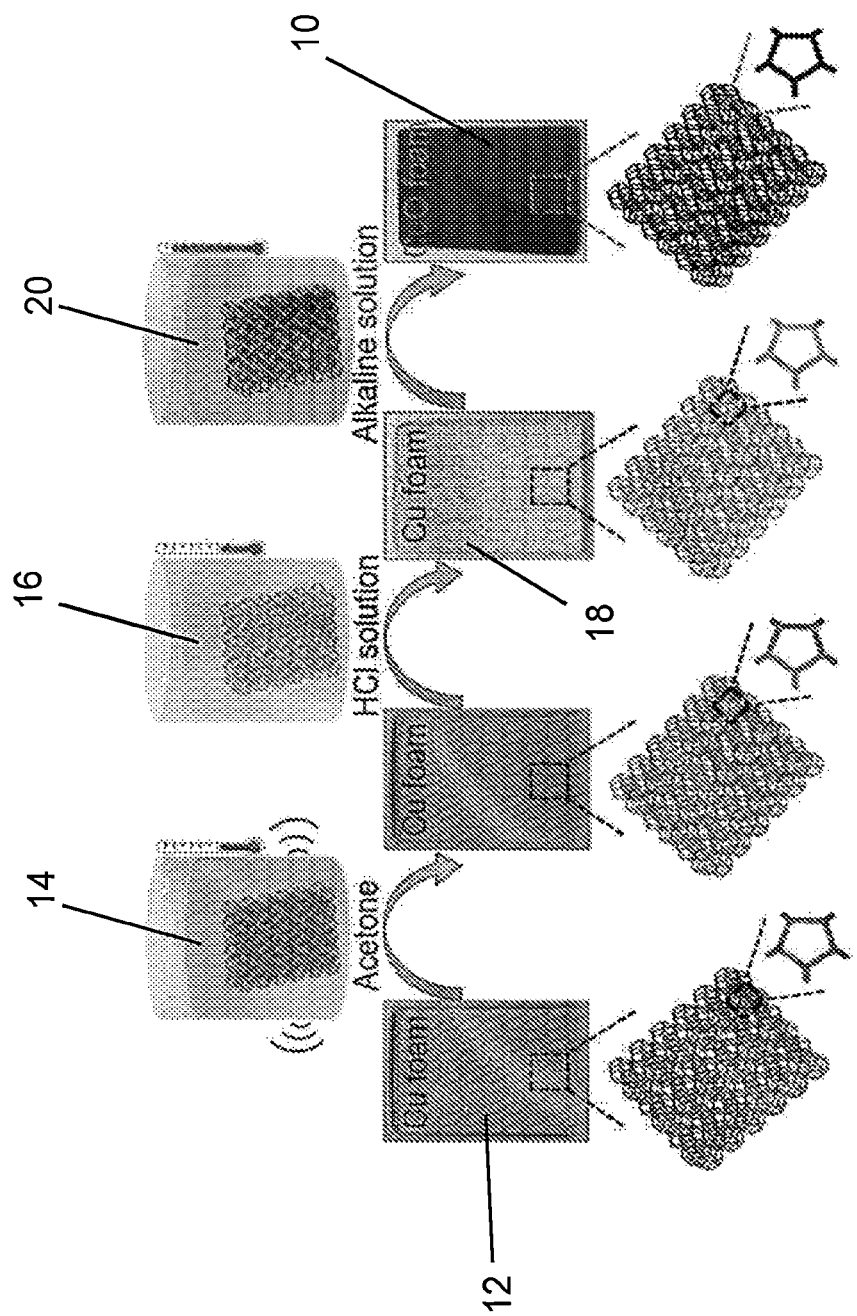

FIG. 1D schematically demonstrates an exemplary scalable wet-chemical oxidation reaction fabrication process of the Cu/CuO foam 10 in accordance with one or more embodiments. In order to enhance its water transport properties, a Cu foam 12 is first pressed using a hydraulic press machine at room temperature to obtain a pressed Cu foam. The pre-pressed Cu foam 12 is then rigorously cleaned via ultrasonic vibration with acetone 14, followed by immersion in a hydrochloric acid solution 16 at room temperature. The vibration and immersion remove the organic residues and native oxide film on the surface, respectively, prior to the following oxidation reaction. The nanostructured CuO on the surface of the Cu foam is formed by dipping the cleaned Cu foam 18 into a hot alkaline solution 20 at 95° C. composed of NaClO$_2$, NaOH, Na$_3$PO$_4$·12H$_2$O, and DI water with a mass percent ratio of 3.75:5:10:100 for 13 min until the Cu foam changes in color from bronze to black. Further details on the fabrication process are provided below.

Scanning electron microscope (SEM) images of the original Cu foam and Cu/CuO foam are shown in FIG. 2A. The interconnected porous structure of original Cu foam with pore sizes and edges diameter mostly ranging from 200 to 400 μm and 60 to 90 μm, respectively, greatly enlarges the evaporation surface, contributes to sufficient water transport through capillarity, and simultaneously allows the generated vapor to escape easily from both sides of the foam through its micrometer-sized pores. The nanostructured CuO conforms to the morphology of Cu foam without changing its interconnected open-pore structure. The blade-like nanostructured CuO growing on the surface of the Cu foam is shown in FIG. 2B at a high magnification. The ultraviolet-visible-near-infrared (UV-vis-NIR) region (≈300-2500 nm) absorption spectra of the Cu/CuO foam with 3 mm thickness in its dry (97.5% to 99%) and wet (96% to 98%) states are shown in FIG. 2C. There is a slight decrease in absorption for the Cu/CuO foam in the wet state, corresponding to a minor increase in its reflectance (the blue dashed curve corresponding to the left axis). It should be noted that the Cu/CuO foams with a pre-pressed thickness of 1 and 2 mm also maintain a consistent high solar absorptance as the thickness of 3 mm. This efficient absorption is attributed to several factors. First, CuO is widely used as a photothermal material with a high extinction coefficient (K) in the visible region. [19] In contrast with the CuO, the absorption spectra of a 2 mm thick pre-pressed Cu foam (gray solid curve) and an original 3 mm thick Cu foam (green solid curve) are much smaller in UV-vis-NIR region, including that the Cu/CuO foam is a much stronger absorber than the Cu foam alone. Second, densely distributed blade-like CuO nanostructures cover the entire surface of the Cu foam after a specific oxidation reaction time, and its nano-scale morphology strengthens its light trapping ability for efficient solar absorption. Furthermore, considering the uneven exterior surface of the Cu/CuO foam with micro-scale pores, sunlight shining on the sunny side of the foam is easily trapped in the foam to further improve solar absorption. Meanwhile, the micro-level surface roughness renders angle-independent absorption even at a high oblique angle, which allow it to efficiently absorb sunlight from majority of angles of incidence (FIG. 2D). In addition to the outstanding solar absorption, the Cu/CuO foam also exhibits excellent hydrophilicity with rapid water infiltration as shown in FIGS. 2E and 2F. Once a water droplet comes in contact with the foam surface, it spreads instantly across the surface, and the water contact angle reaches 0°. The superb water penetration performance of the Cu/CuO foam is ascribed to both the superhydrophilic properties of CuO and the interconnected porous structure of the foam.

Water Diffusion Behavior in the 2.5D Cu/CuO Foams

Figures 3A, 3B:
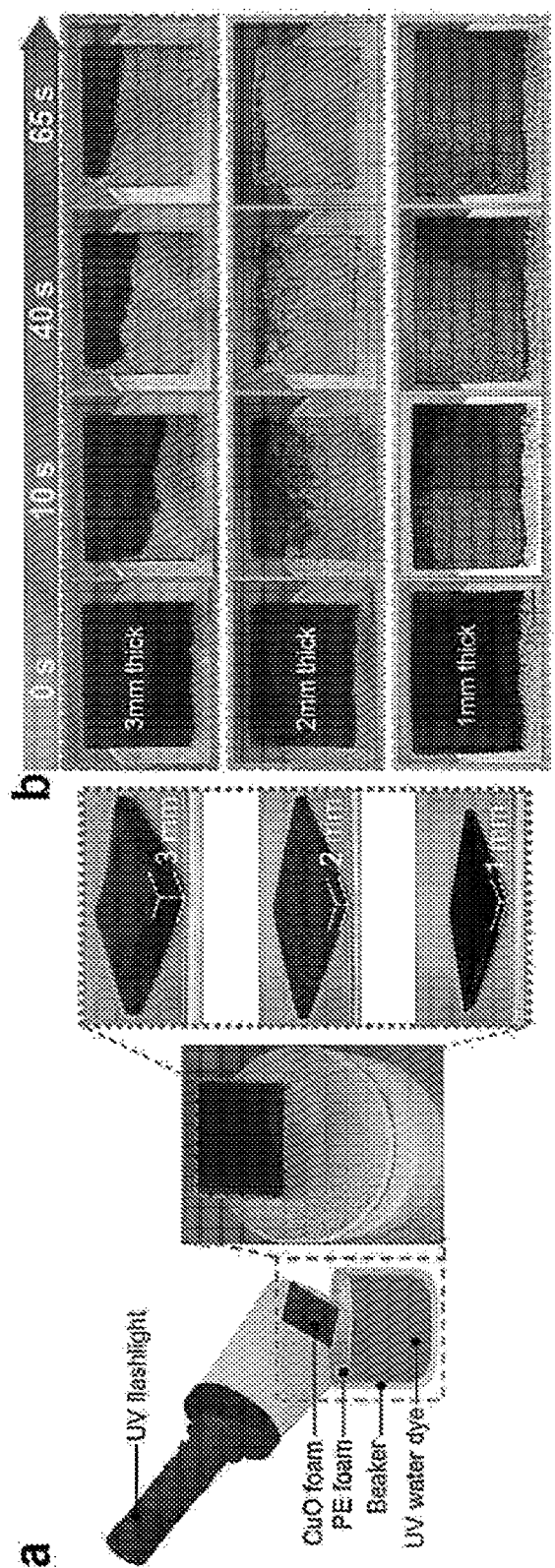
FIGS. 3A-3E show performance of thickness-dependent 2.5D Cu/CuO foams.
Figures 3C, 3D, 3E:
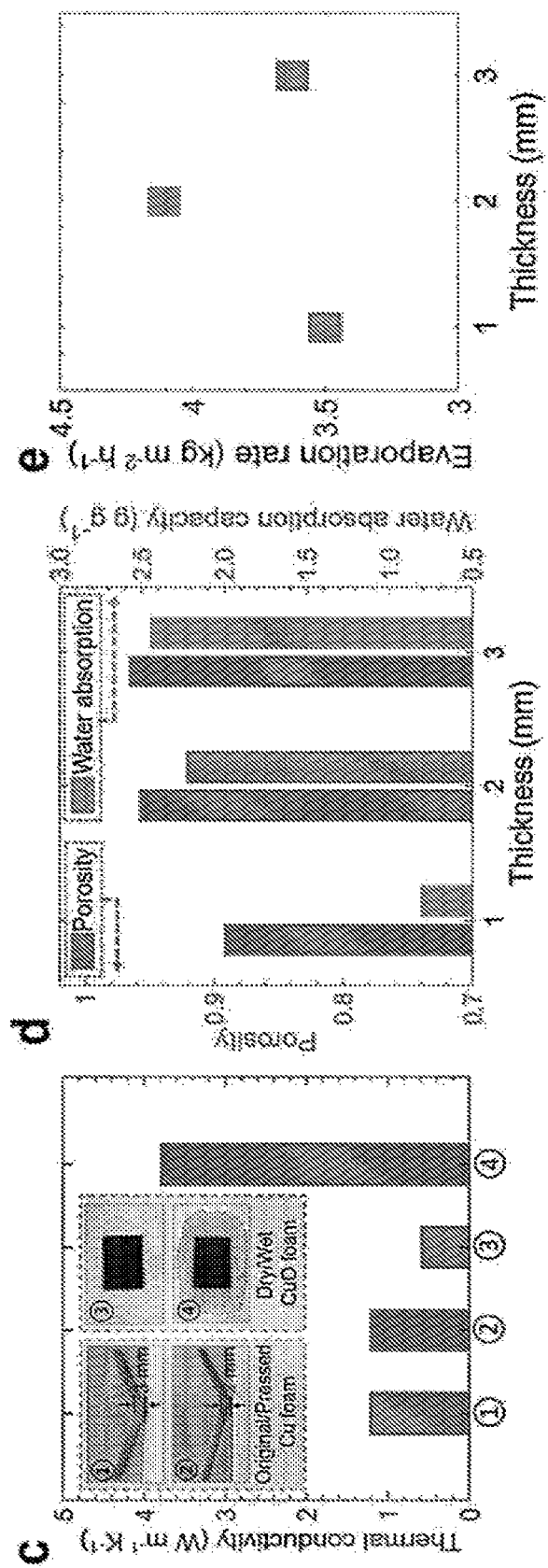

The spatial water transport behavior in the 2.5D Cu/CuO foam is also noted as a pivotal factor benefiting the evaporation performance. Water diffusion in the Cu/CuO foams of different thickness was researched to identify a balance between wettability and porosity, allowing for the identification of optimal evaporation performance. FIG. 3A shows the schematic setup for this water diffusion test. The Cu/CuO foams of different pre-pressed thickness (3 mm, 2 mm, and 1 mm) are inserted obliquely into a beaker filled with water and UV reactive dye. Under the illumination of a UV light, the dyed water fluoresces a bright yellow-green color-useful for visual contrast. The 44 mm in width by 30 mm in length (over the water surface) foams with varying thicknesses are fixed at a tilt angle of 55° using polyethylene foam. Note that from top to bottom, the photographs show the foam of original thickness (3 mm), the foam that is pre-pressed to 2 mm in thickness prior to the cleaning process, and the foam that is pre-pressed to 1 mm in thickness prior to the cleaning process. FIG. 3B shows the time-dependent water transport rate and distance in this test. As expected, there is no problem with water transportation in the Cu/CuO foam because of both its porous structure and the hydrophilic properties of the nanostructured CuO growing on the Cu foam surface. The 2 mm and 3 mm thick samples illustrate how water can be effectively transported to the top of the foam (30 mm in length), covering the entire area in a relatively short time via the strong capillary force. Note that the 1 mm thick Cu/CuO foam has the longest transport length fully filling with water at different transport times, which is slightly better than that of the 2 mm thick sample. Although the Cu/CuO foam with an original thickness of 3 mm has a relatively slow transport rate, most of its area is sufficiently covered by water with an average transport length of 21 mm, which accounts for 70% of total area. Additionally, the water absorption capacity of the Cu/CuO foam is indicated by its thermal conductivity. As shown in FIG. 3C, the thermal conductivities of Cu foams of the thickness of 3 and 2 mm are nearly constant due to the relatively small change in thickness. The thermal conductivity of the 2 mm thick Cu/CuO foam is half that of the 2 mm thick Cu foam since the Cu (with thermal conductivity of 400 W m$^{-1}$ K$^{-1}$) on the outer surface of the Cu foam skeleton is replaced by a layer of nanostructured CuO (with thermal conductivity of 33 W m$^{-1}$ K$^{-1}$) and the void volume inside the foam remains almost unchanged. However, the 2 mm thick wet Cu/CuO foam has a thermal conductivity of 3.8 W m$^{-1}$ K$^{-1}$, which is six times higher than its dry counterpart. This is a result of its void volume being filled with water and pushing out the air inside, made possible by its large water absorption capacity. The increased thermal conductivity facilitates the heat transfer from the high-temperature sunny side to the low-temperature shady side, accelerating the evaporation rate. The porosity ($\varepsilon$) of the foam is calculated by $\varepsilon=V_v/V_t$ where $V_v$ is the void volume and $V_t$ is the total volume. The porosities of the Cu/CuO foam increases with thickness, as shown in FIG. 3d, where samples of thickness 1 mm, 2 mm, and 3 mm have respective porosities of 0.89, 0.95, and 0.97. The water absorption capacity is calculated by $(m_w-m_d)/m_d$, where $m_w$ is the weight of foam with the absorbed water, and ma is the initial weight of the dry foam. Although the pre-pressed 1 mm thick Cu/CuO foam with the smallest porosity demonstrates noticeable water transport performance and timely water transport relaying on the strong capillary force, its poor water absorption capacity hinders it from becoming the first choice for an evaporation application. Instead, the thicker samples (2 and 3 mm of thickness) exhibit a significant improvement in water absorption capacity ensuring an adequate water supply for high evaporation performance. Finally, after comprehensively considering the timely and sufficient water supply ability and remarkable water absorption capacity of the Cu/CuO foams of different thicknesses, the 2 mm thick sample is identified to offer the highest evaporation rate within these experiments (FIG. 3E).

Solar-Driven Steam Generation Performance

Excellent photothermal response of an evaporator allows for rapid solar-driven steam generation. Infrared (IR) images were employed to investigate the photothermal performance of an exemplary 2.5D Cu/CuO foam under one Sun illumination. An exemplary experimental setup for evaluating the temperature evolutions of the Cu/CuO foam under a one Sun irradiance is schematically elucidated in FIG. 4A. The 2.5D Cu/CuO foam with a tilt angle of 55° was placed in the center of the illumination beam of the solar simulator to provide it with the maximum possible collimated light. The dimensions of Cu/CuO foam used in the evaporation experiment were 44 mm in width, 35 mm in total length (30 mm exposed in air, 5 mm in water), and 2 mm in thickness.

Figures 4A, 4B, 4C:
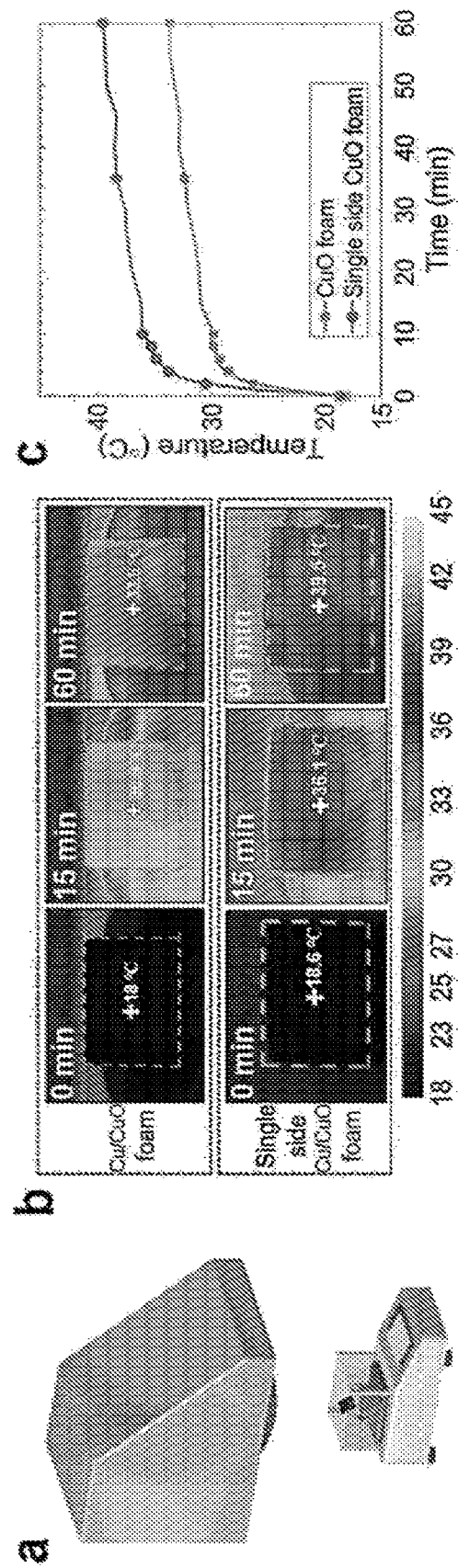
FIGS. 4A-4F show the experimental apparatus and solar steam generation performance of a 2.5D evaporator.
Figures 4D, 4E, 4F:
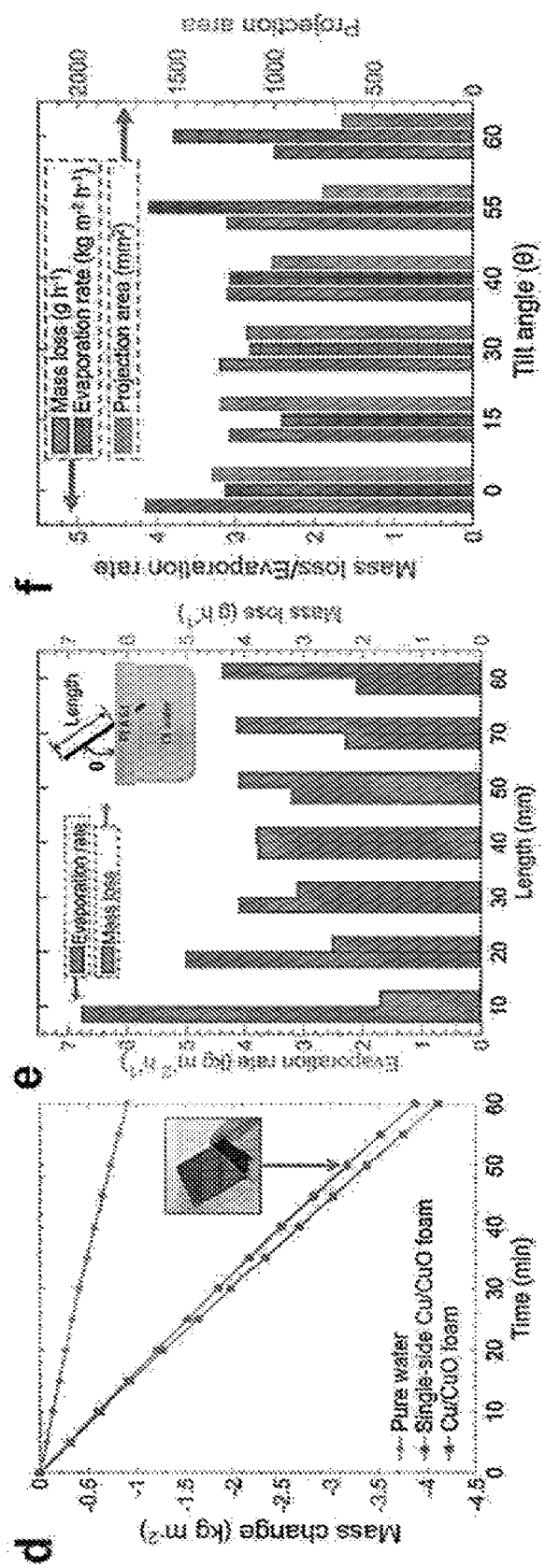

The water diffusion behaviors in the Cu/CuO foam are independent of the depths of 2 mm thick Cu/CuO foam in water, and the corresponding evaporation performances have no dramatic fluctuations. FIG. 4B illustrates the temperature distributions of the 2.5D Cu/CuO foam and the 2.5D single-side Cu/CuO foam with its shady side stuck with a transparent tape at 0, 15, and 60 min after the solar simulator is illuminated. The central temperature (the white plus sign) of the 2.5D Cu/CuO foam is selected as the representative temperature used to evaluate the photothermal performance under one Sun because the temperature of the 2.5D foam decreases from top to bottom. The central temperature of the Cu/CuO foam rises rapidly to 30.9° C. within the first 15 min and subsequently stabilizes at 33.6° C. after 60 min, demonstrating its fast photothermal response under sunlight illumination, as shown in FIG. 4C. The single-side Cu/CuO foam, however, responds faster than the Cu/CuO foam under one sun irradiation, since the generated vapor of the Cu/CuO foam can escape from both sides (sunny and shady sides), rejecting additional heat to the environment through evaporation than the single-side Cu/CuO foam (sunny side only). The central temperature of the Cu/CuO foam is 5.9° C. lower than that of the single-side Cu/CuO foam. Despite the relatively low central temperature of the Cu/CuO foam, it yields a rapid evaporation rate of 4.1 kg m$^{-2}$ h$^{-1}$ (FIG. 4D), owing to the evaporation contributions from the shady sides. Moreover, the high thermal conductivity of the Cu/CuO foam (3.8 W m$^{-1}$ K$^{-1}$ in wet state) contributes to the quick transportation of the absorbed heat from the sunny side quickly to the shady side. An evaporation rate of 3.8 kg m$^{-2}$ h$^{-1}$ is demonstrated by the single-side Cu/CuO foam with the same spatial dimensions, indicating an evaporation rate of around 0.3 kg m 2 h$^{-1}$ for the shady side. Furthermore, the finalized Cu/CuO foam with a thickness of 2 mm, which makes a little contribution to the evaporation performance allowing generated vapor to diffuse out. To address this sidewall effect, three sidewalls of the Cu/CuO foam is sealed with waterproof glue in the steam generation measurement. The evaporation rate of 2.5D Cu/CuO foam only decreases from 4.1 to 3.92 kg m$^{-2}$ h$^{-1}$, indicating that the great majority of vapor diffuses out through the double working sides. FIG. 4E demonstrates the dependence of the evaporation rate and the corresponding mass loss on the length of the 2.5D Cu/CuO foam. Overall, the mass losses of water within 1 h gradually rise as the length of the 2.5D Cu/CuO foam in the air varies from 10 to 40 mm and then fluctuates around 4.1 g when the length is greater than 40 mm. While the evaporation rate of the 2.5D Cu/CuO foam keeps decreasing as the length increases from 10 to 80 mm. When the length of the 2.5D Cu/CuO foam lies between 10 and 30 mm, the entire Cu/CuO foam is supplied with sufficient water for effective evaporation. Although the evaporation rates for the cases with length of 10 and 20 mm are higher than that of the 30 mm, their mass changes are much lower than that of the 30 mm, which is not desirable for the real applications with a preference of high freshwater yields. Indeed, for the cases with the length of the Cu/CuO foam greater than 30 mm, their mass changes present a certain advantage over those with the shorter length. However, the maximum length of a 2 mm thick 2.5D Cu/CuO foam (55° tilt angle) fully filling with water is 30 mm, and this value does not change with the depth of foam in water. Thus, the region which is above 30 mm in the foam receives limited water transported from the bulk water. Some top regions even have no water to evaporate and this length will become a "dead length." This redundant length will increase the convective heat transfer area with the air and dissipate more heat to the surroundings, while its projection area is still involved in the calculation of the evaporation rate, which leads to a dramatic drop of the evaporation rate. The evaporation rate of the 2.5D structure Cu/CuO foam evaporator is a complex coupling result of the tilt angle, water mass change, and the length of the 2.5D Cu/CuO foam. The dependence of the mass loss, evaporation rate, and corresponding projection area when the tilt angle of the 2.5D Cu/CuO foam changes from 0° to 60° is illustrated in FIG. 4F. when the tilt angle increases from 15° to 55°, all the mass losses are around 3.1 g h$^{-1}$ for the 2.5D Cu/CuO foam used with the dimensions of 44 mm in width, 30 mm in length (exposed to air), and 2 mm in thickness, and the corresponding evaporation rate increases from 2.4 to 4.1 kg m$^{-2}$ h$^{-1}$. Due to the good water diffusion ability in the Cu/CuO foam, the water can be rapidly transported to the entire foam and quickly spans entire area of foam via the strong capillary force. Considering the good solar absorption of nanostructured CuO, thus, the mass loss in 1 h does not fluctuate with the tilt angles. The projection area decreases with the increase of tilt angles which renders a higher evaporation rate with an increasing tilt angle. However, the mass loss of the 2.5D Cu/CuO foam drops from 3.11 to 2.5 g h$^{-1}$ when the tilt angle increases from 55° to 60° and then the evaporation rate decreases from 4.1 to 3.78 kg m$^{-2}$ h$^{-1}$. This result from that of a water supply of the 2.5D Cu/CuO foam with a tilt angle of 60° is less sufficient when compared with that of angles from 15° to 55° even though the foam at a tilt angle of 60° has a smaller projection area. For the mass losses and evaporation rates of the situations with angles of 0° and 15°, there is a comparison between the 2D Cu/CuO foam and 2.5D Cu/CuO foam. The 2D Cu/CuO foam with a tilt angle of 0° has a mass loss of 4.1 g h$^{-1}$ corresponding to an evaporation rate of 3.1 kg m$^{-2}$ h$^{-1}$, and the mass loss is relatively higher than the 2.5D Cu/CuO foam at a tilt angle of 55° (3.11 g h$^{-1}$). This is due to the quicker and more sufficient water supply by directly immersed into water compared with the water supply method through the capillary force of the tilted 2.5D Cu/CuO foam. However, the projection area of the 2D Cu/CuO foam (1320 mm2) is much larger than that of the 2.5D Cu/CuO foam with a tilt angle of 55° (757 mm2). Considering that the 2.5D design with one end lifted in the air can effectively increase spatial utilization, it is evident that a length of 30 mm and a tilt angle of 55° is a good choice for the efficient solar steam generation.

Figures 5A, 5B, 5C:
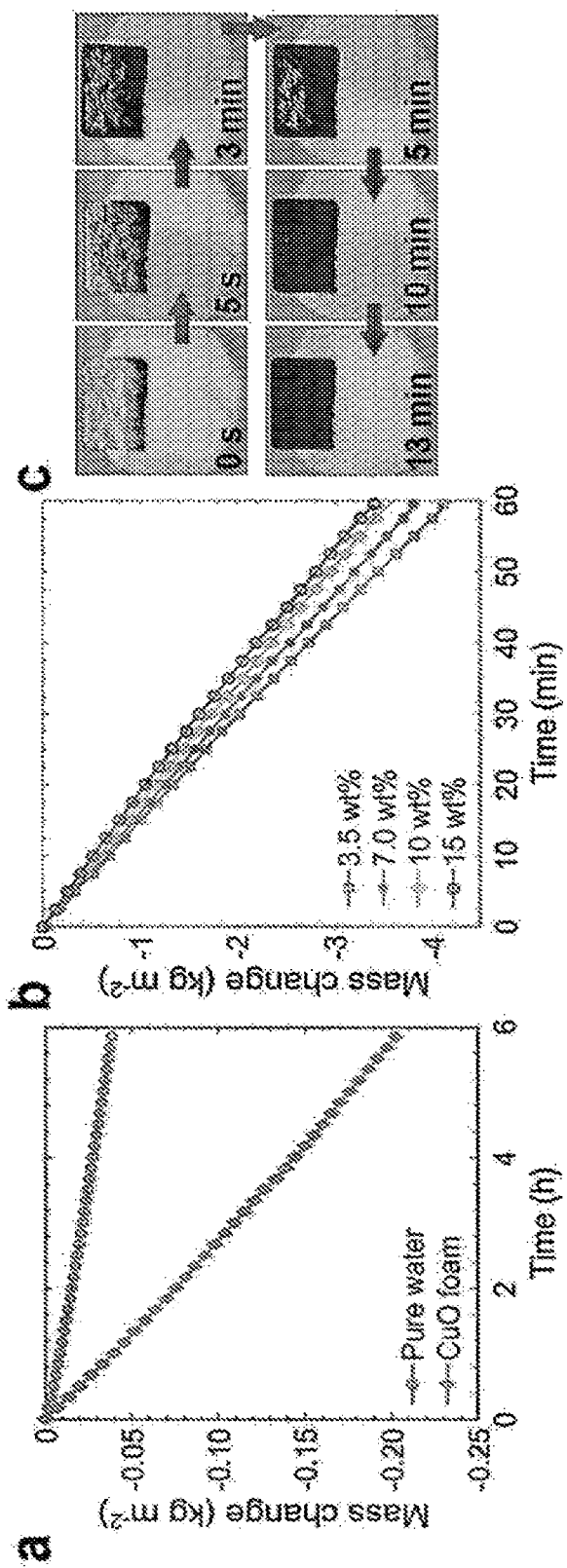
FIGS. 5A-5F show the desalination performance of a 2.5D evaporator under the conditions of various salinity and solar intensity.
Figures 5D, 5E, 5F:
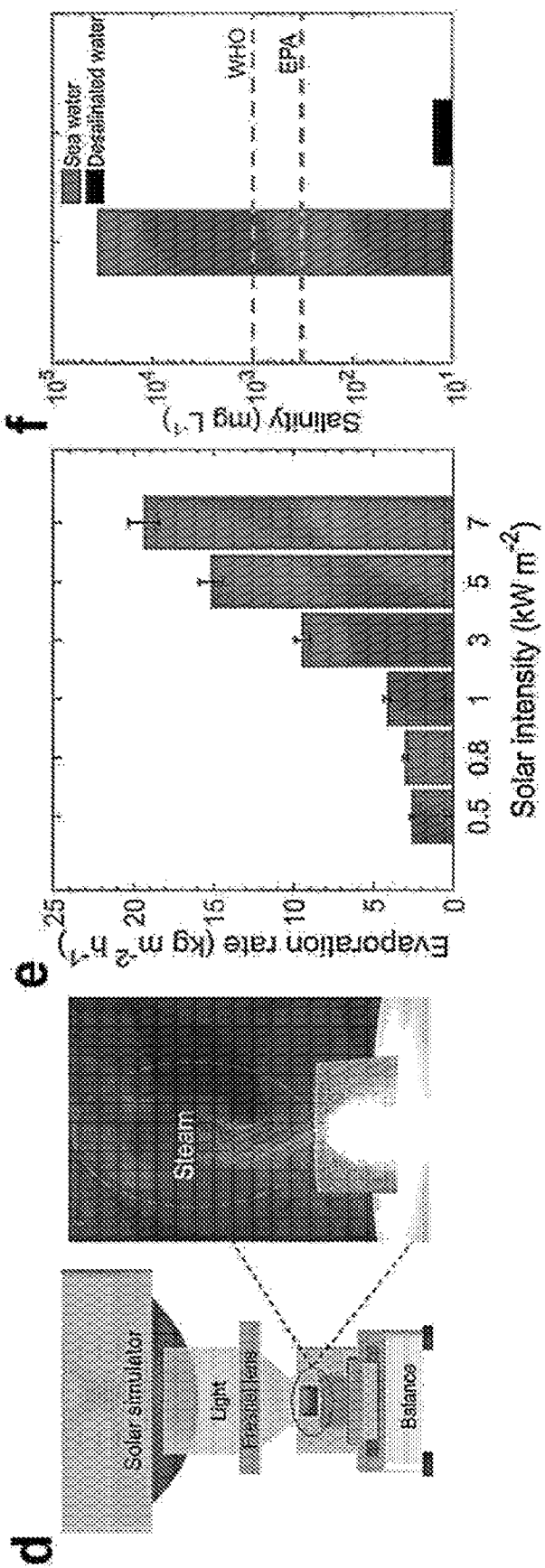

The high evaporation rate of the 2.5D Cu/CuO foam (4.1 kg m$^{-2}$ h$^{-1}$) comes from the expanded evaporation surface that is involved in the water phase transform and the expanded exterior surface, which assists in vapor diffusion. The sunny side converts sunlight into heat and transfers this heat partially to the shady side, resulting in two evaporation sides. To verify this, the dark environment experiment was run continuously for 6 h eliminating all sunlight effects, as shown in FIG. 5A. The evaporation rate under a dark environment of the 2.5D Cu/CuO foam (0.207 kg m$^{-2}$ h$^{-1}$) is 5.3 times that of pure water (0.039 kg m$^{-2}$ h$^{-1}$), confirming that the rapid evaporation rate is attributed to the enlarged evaporation surface and double-sided diffusion area. Salt concentration is an inevitable issue for evaporative steam generation within saline environments. The effects of salt concentration on the evaporation rates of the 2.5D Cu/CuO foam are shown in FIG. 5B. The evaporation rate of the 2.5D Cu/CuO foam decreases from 4.1 kg m$^{-2}$ h$^{-1}$ for a 3.5 wt % NaCl solution to 3.4 for a 15 wt % NaCl solution. The evaporation performance of the 2.5D Cu/CuO foam is reduced by only 17% when the salt concentration is increased by a factor of 4.3, which exemplifies its excellent salt-rejection ability. Strong salt rejection capabilities are essential for solar-driven desalination applications. Accumulated salt clogs water channels, which hinders water pumping, prevents salt drainage, weakens light absorption, and can dramatically decrease the evaporation rate to as low as zero. Hence, excellent salt-rejection capabilities are highly desired in solar desalination applications, especially for high-salinity brines. FIG. 5C elucidates the efficient salt drainage performance of the 2.5D Cu/CuO foam. 1.6 g of NaCl diffuses speedily from the 2.5D Cu/CuO foam into the bulk salt water (3.5 wt % NaCl solution) within 13 min benefiting from its micro-sized interconnected porous structure and strong water transportation, which validates its exceptional salt-rejecting capabilities. To validate the long-term stability of evaporation performance for the 2.5D Cu/CuO foam, a 12 h solar desalination experiment with 3.5 wt % NaCl solution was conducted consisting three 4 h continuous experiments under 1 Sun irradiation. The evaporation rates of the long-time solar desalination experiments stabilize around 4.05 kg m$^{-2}$ h$^{-1}$, which validates the stability of the 2.5D Cu/CuO foam for long-term solar desalination applications. FIG. 5D shows the experimental setup for the solar desalination experiment under high solar intensities, and the photograph on the right visibly shows the plentiful steam generation of the 2.5D Cu/CuO foam under an illumination of five suns. The variations in solar intensity are controlled through modifying the distance between the sample and the Fresnel lens. Evaporation rates of the 2.5D Cu/CuO foam under various solar irradiance values are shown in FIG. 5E. An evaporation rate of 19.4 kg m 2 h$^{-1}$ is observed under seven suns irradiation. The 2.5D Cu/CuO foam yields evaporation rates of 2.6 and 3.0 kg m$^{-2}$ h$^{-1}$ when the solar intensities are set at 0.5 and 0.8 kW m$^{-2}$, validating the excellent working performance of the 2.5D Cu/CuO foam even under weak sunlight. To ensure the desalination performance of the 2.5D Cu/CuO foam under harsh environments such as high-salinity water and concentrated solar irradiance, a 50 nm thick SiO$_2$ protection layer is deposited by an E-beam evaporator on the CuO nanosurface, without sacrificing the optical properties of the pristine Cu/CuO foam as shown in FIG. 2C. Water quality after desalination is a crucial standard for solar-driven water purification as well. As such, seawater collected from Revere Beach (Boston, MA) was used to evaluate the water quality of the Cu/CuO-desalinated water. The salinity of the purified water after desalination decreases by ≈4 orders of magnitude when compared to the original seawater, and its salinity is well below the drinking water standards defined by the World Health Organization (1% o) and the US Environmental Protection Agency (0.5% o) in FIG. 5F.

CONCLUSION

An efficient 2.5D photo-thermal evaporator is disclosed having a porous Cu/CuO foam with one end of the foam lifted out of the water and into the air, achieving a high evaporation rate of 4.1 kg m$^{-2}$ h$^{-1}$. A one-step wet-chemical oxidation can transform Cu into black CuO, converting highly reflective metal into a remarkable photothermal material with a solar absorptance of 0.99. The micro-sized open-pore structure of the Cu/CuO foam allows it to harvest additional solar energy by increasing the number of reflections of the incident sunlight, and the nano-structured CuO grown on the outer surface effectively scatters sunlight inside the trapping pores. Both the multiple reflections and increased scatterings enhance the photothermal conversion of the Cu/CuO foam, which enables the rapid photothermal response of this evaporator. The innate hydrophilicity of CuO and the surface tensile forces of water inside the open pores of the Cu/CuO foam result in strong capillarity and efficiently pump water to the evaporation interfaces, allowing the foam to achieve extremely rapid evaporation. Simultaneously, the open pores, acting as water pathways, drain the remnant salt down to the bulk water, preventing both salt accumulation and the blockage of the water transport channels. This 2.5D structure with only one end of the Cu/CuO foam inserted into the water extensively reduces the contact area between the evaporator and the bulk water, protecting the absorbed heat from diffusing into the bulk water and localizing heat to the interfacial evaporation regions. The micro-sized interconnected porous structure of the Cu/CuO foam markedly amplifies evaporation performance by accelerating the water phase change process. Furthermore, the doubled working sides of the Cu/CuO foam enlarge the exposure area and effectively diffuse the generated vapor into the air. Additionally, no extra photothermal materials are consumed for this 2.5D structural design when compared to the 2D structure counterpart, and this design promises both mechanical strength and longtime working durability. The quality of the purified water after desalination is well above the standard defined by both WHO and EPA. Taking advantage of these advanced features of scalable and easy-to-fabricate Cu/CuO foam, the 2.5D solar-driven evaporator can be employed widely in large-scale engineering applications.

Experiment Details

Materials: Copper foam was purchased from Shengshida Metal Material Co., Ltd, China with a pore diameter range of 200 to 400 μm, skeleton diameter range of 60 to 90 μm, and thickness of 3 mm. Acetone, ethanol, isopropyl alcohol (IPA), hydrochloric acid (HCl, 37 wt %), sodium chlorite ($NaClO_2$), sodium hydroxide (NaOH), sodium phosphate tribasic dodecahydrate ($Na_3PO_4 \cdot 12H_2O$) were all purchased from Sigma-Aldrich, USA. All chemicals were directly used as received without further purification. Polylactic acid white filament for use with a 3D printer was purchased from Dremel Digilab, USA. $SiO_2$ evaporation material was provided by Kurt J. Lesker Company with a purity of 99.99%.

Fabrication of the Cu/CuO Foams: The original Cu foam as received with 3 mm in thickness was pressed into 2 mm in thickness by the hydraulic press machine (Dabpress, USA). The CuO foam was fabricated as follows: the pressed Cu foam was first cleaned with acetone in an ultrasonic bath for 10 min. After washing it with ethanol, IPA and deionized (DI) water in series, the Cu foam was dried in a clean Argon stream and immediately immersed into a 2.0 M hydrochloric acid solution for 10 min to remove the native oxide film on the surface. Subsequently, the Cu foam was rigorously rinsed with DI water and dried again with a clean Argon stream. All the above operations were carried out at ambient temperature. Next, the alkaline solution composed of $NaClO_2$, NaOH, $Na_3PO_4 \cdot 12H_2O$, and DI water with a mass percent ratio of 3.75:5:10:100 was heated up to 95° C., and the cleaned Cu foam was dipped into the alkaline solution for 3 min to form nanostructured CuO. After that, the CuO foam was washed thoroughly with DI water to remove the remaining alkaline solution and dried with an Argon steam. A thickness of 50 nm $SiO_2$ coating layer was deposited using an E-beam evaporator at a vacuum of $2 \times 10^{-6}$ Torr.

Solar Steam Generation Experiments: The steam generation experiments in the lab were carried out under a solar simulator (Newport, 94081A, class ABB), which supplies solar flux of 1 kW m$^{-2}$ with an optical filter for the standard AM 1.5 G spectrum. Solar intensity at the position of the Cu/CuO foam was measured by a TES 132 solar power meter. DI water and NaCl solutions with various concentrations were prepared at the same initial temperature of 19° C. and placed in the glass Petri dish with an inside diameter of 103 mm. The Petri dish was covered with a corresponding 2 mm thick 3D printed white lid which had a slot at a tilt angle of 55° with respect to the horizontal direction. The Cu/CuO foam with dimensions of 44 mm in width, 35 mm in length, and 2 mm in thickness was inserted into the slot on the lid which kept 30 mm in length exposed in air. To accurately monitor the mass of the water, the Petri dish was placed on an electric balance (RADWAG, PS 1000.X2.NTEP) with a resolution of 0.001 g connected to a computer which enabled the recording of the real-time mass change. The real-time temperature was monitored by an infrared radiation camera (FLIR, A655sc).

Materials Characterizations: The reflectance spectra (UV-vis-NIR range: ≈300-2500 nm) are measured by the Jasco V770 spectrophotometer at an incident angle of 6° with the ISN-923 60 mm BaSO4 based integrating sphere equipped with PMT and PbS detectors. The reflectance spectra were normalized by a PTFE based reflectance standard. The reflectance spectra at different AOI were characterized by using wedges of different angles at the sample port of the Jasco V770 spectrophotometer. The transmittance spectra (mid-infrared region: ≈2.5-20 μm) were measured by the Jasco FTIR 6600 spectrometer at a normal incident angle with reference to the background spectrum of a hydraulic pressed KBr film (20 psi). The Extech EC400 ExStik salinity meter was utilized to characterize the water quality of the collected water samples. Infrared images of samples were taken employing the FLIR A655C thermal camera at a resolution of 640×480 with a 25° lens. The thermal conductivity of samples was characterized by the Hotdisk TPS 2500s. The contact angle of samples was measured by SINDIN SDC-350 contact angle meter. High-speed images were recorded by the Chronos 2.1-HD.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

REFERENCES

[1] P. H. Gleick, Water in Crisis, A Guide to the World's Fresh Water Resources, Oxford University Press, Oxford 1993, 9, p. 473.

[2] Tao, P., Ni, G., Song, C. et al. Solar-driven interfacial evaporation. Nat Energy 3, 1031-1041 (2018). https://doi.org/10.1038/s41560-018-0260-7

[3] A. Kabeel, S. El-Agouz, Review of researches and developments on solar stills, Desalination 2011, 276, 1.

[4] Z. Deng, J. Zhou, L. Miao, C. Liu, Y. Peng, L. Sun, S. Tanemura, The emergence of solar thermal utilization: solar-driven steam generation, J. Mater. Chem. A 2017, 5, 7691.

[5] V. D. Dao, H. S. Choi, Carbon-Based Sunlight Absorbers in Solar-Driven Steam Generation Devices, Global Challenges 2018, 2, 1700094.

[6] X. Jin, Y. Li, W. Li, Y. Zheng, Z. Fan, X. Han, W. Wang, T. Lin, Z. Zhu, Nanomaterial Design for Efficient Solar-Driven Steam Generation, ACS Appl. Energy Mater. 2019, 2, 6112.

[7] P. Zhang, J. Li, L. Lv, Y. Zhao, L. Qu, Vertically Aligned Graphene Sheets Membrane for Highly Efficient Solar Thermal Generation of Clean Water, ACS Nano 2017, 11, 5087.

[8] F. Yu, Z. Guo, Y. Xu, Z. Chen, M. S. Irshad, J. Qian, T. Mei, X. Wang, ACS Appl. Mater. Interfaces 2020, 12, 57155.

[9] J. Jia, W. Liang, H. Sun, Z. Zhu, C. Wang, A. Li, Fabrication of bilayered attapulgite for solar steam generation with high conversion efficiency, Chem. Eng. J. 2019, 361, 999.

[10] T. Chen, J. Xia, J. Gu, G. Lu, Q. Xue, C. Liu, L. Yan, T. Chen, Chem. Eng. J. 2020, 127947.

[11] X. Li, W. Xu, M. Tang, L. Zhou, B. Zhu, S. Zhu, J. Zhu, Proc. Natl. Acad. Sci. U.S.A 2016, 113, 13953.

[12] S. Hong, Y. Shi, R. Li, C. Zhang, Y. Jin, P. Wang, ACS Appl. Mater. Interfaces 2018, 10, 28517.

[13] Y. Shi, R. Li, Y. Jin, S. Zhuo, L. Shi, J. Chang, S. Hong, K. C. Ng, P. Wang, A 3D Photothermal Structure toward Improved Energy Efficiency in Solar Steam Generation, Joule 2018, 2, 1171.

[14] Y. Geng, W. Sun, P. Ying, Y. Zheng, J. Ding, K. Sun, L. Li, M. Li, Adv. Funct. Mater. 2020, 31, 2007648.

[15] G. Chen, N. Li, J. He, L. Qiao, F. Li, S. Wang, L. Yu, P. Murto, X. Li, X. Xu, Design of self-righting steam generators for solar-driven interfacial evaporation and self-powered water wave detection, J. Mater. Chem. A 2020, 8, 24664.

[16] H. Wang, C. Zhang, Z. Zhang, B. Zhou, J. Shen, A. Du, Adv. Funct. Mater. 2020, 30, 2005513.

[17] L. Wu, Z. Dong, Z. Cai, T. Ganapathy, N. X. Fang, C. Li, C. Yu, Y. Zhang, Y. Song, Nat. Commun. 2020, 11, 1.

[18] J. Li, X. Wang, Z. Lin, N. Xu, X. Li, J. Liang, W. Zhao, R. Lin, B. Zhu, G. Liu, L. Zhou, S. Zhu, J. Zhu, Joule 2020, 4, 928.

[19] B. Karlsson, C. G. Ribbing, A. Roos, E. Valkonen, T. Karlsson, Phys. Scr. 1982, 25, 826.

The invention claimed is:

1. A photothermal evaporator for use in a water desalination system, comprising:
a planar copper (Cu) foam having a first surface, a second surface opposing the first surface, a thickness therebetween, a first end, a second end, and an interconnected open-pore structure, the first end of the Cu foam positioned in a body of water, the second end positioned above the body of water, and the interconnected open-pore structure delivering water from the first end of the Cu foam to a second end of the Cu foam via capillary action;
and a copper oxide (CuO) layer formed on outer surfaces of the Cu foam and having a flat, tapered nanostructure, the nanostructure converting incident sunlight to heat, the Cu foam positioned such that the first surface receives the heat generated from the CuO layer and conducts the heat across the thickness of the CuO layer, thereby generating a vapor and diffusing the vapor through the first and second surface.

2. The photothermal evaporator of claim 1, wherein the evaporator has a thickness of 2-4 mm.

3. The photothermal evaporator of claim 1, wherein the evaporator has a thickness of 2 mm.

4. The photothermal evaporator of claim 1, wherein the CuO layer has a solar absorptance of 0.99.

5. The photothermal evaporator of claim 1, wherein the incident sunlight is reflected in the interconnected open-pore structure of the Cu foam to increase harvesting of the solar energy.

6. The photothermal evaporator of claim 1, wherein the flat tapered nanostructure of the CuO layer scatters incident sunlight into the open-pore structure of the Cu foam.

7. The photothermal evaporator of claim 1, wherein the evaporator has an oblique orientation relative to a surface of the body of water.

8. The photothermal evaporator of claim 1, wherein the evaporator has an oblique orientation relative to a surface of the body of water at a tilt angle of 55°.

9. The photothermal evaporator of claim 1, wherein the Cu foam is a pressed Cu foam.

10. The photothermal evaporator of claim 1, further comprising a silica ($SiO_2$) layer formed on the CuO layer.

11. The photothermal evaporator of claim 1, wherein the first end and the second end of Cu foam are disposed at opposite longitudinal ends of the Cu foam.

12. The photothermal evaporator of claim 1, wherein the first surface and the second surface have a greater surface area than side walls of the Cu foam.

* * * * *